United States Patent [19]
Holland et al.

[11] Patent Number: 5,988,289
[45] Date of Patent: Nov. 23, 1999

[54] SOD LAYING APPARATUS

[76] Inventors: Gregory Paul Holland, 6504 3$^{rd}$ St. N., Moorhead, Minn. 56560; Steven Douglas Ishaug, 63 6$^{th}$ Ave. N., #1, , Fargo, N. Dak. 58102

[21] Appl. No.: 08/905,635

[22] Filed: Aug. 4, 1997

[51] Int. Cl.$^6$ .................................................. A01B 45/00
[52] U.S. Cl. ........................... 172/20; 242/403; 242/557; 242/919; 414/528; 414/911; 414/920
[58] Field of Search ..................... 721/19, 20; 414/528, 414/911, 920, 786, 24.6; 242/403, 557, 919

[56] References Cited

U.S. PATENT DOCUMENTS

| | | | |
|---|---|---|---|
| 2,358,000 | 9/1944 | Cornell | 172/20 X |
| 2,780,376 | 2/1957 | Sanders | 414/528 X |
| 3,302,739 | 2/1967 | Beck et al. | 414/528 X |
| 3,632,054 | 1/1972 | Heppelmann | 242/557 |
| 3,807,505 | 4/1974 | Nunes | 172/20 |
| 3,854,610 | 12/1974 | Carder | 414/528 X |
| 3,982,711 | 9/1976 | Bradley et al. | 172/19 X |
| 4,084,763 | 4/1978 | Zamboni | 242/86.52 |
| 4,164,295 | 8/1979 | White | 414/786 |
| 4,456,399 | 6/1984 | Conover | 242/557 X |
| 4,754,815 | 7/1988 | Brouwer et al. | 172/2 |
| 4,777,890 | 10/1988 | Raymond | 172/19 X |
| 4,861,219 | 8/1989 | Mayle | 414/911 X |
| 4,878,542 | 11/1989 | Brouwer et al. | 172/1 |
| 4,890,801 | 1/1990 | Brouwer et al. | 242/56 B |
| 4,944,352 | 7/1990 | Brouwer et al. | 172/19 |
| 4,968,205 | 11/1990 | Biasotto et al. | 414/24.6 |
| 5,000,394 | 3/1991 | Wales et al. | 242/557 X |
| 5,119,744 | 6/1992 | Comer | 111/127 |
| 5,129,462 | 7/1992 | Mail | 172/19 |
| 5,207,168 | 5/1993 | Comer | 111/200 |
| 5,215,278 | 6/1993 | Hess | 242/86.52 |
| 5,307,880 | 5/1994 | Woerner | 172/19 |
| 5,437,528 | 8/1995 | Decker | 414/24.6 |
| 5,509,770 | 4/1996 | Burenga | 242/557 X |
| 5,697,452 | 12/1997 | Link | 172/19 |

*Primary Examiner*—Christopher J. Novosad
*Attorney, Agent, or Firm*—Curtis V. Harr

[57] ABSTRACT

A three wheeled sod laying apparatus is provided that employs a hydrostatic power system which allows the drive function and sod dispensing function to be operated at different speeds. This configuration enables the operator to vary the speed at which the sod is dispensed from the apparatus in relation to its forward speed to compensate for varying terrain or for inconsistences in the sod roll itself. The three wheeled configuration allows for a highly maneuverable vehicle that can straddle new sod as it is laid. Thus, the present invention allows for the laying of sod from large commercial sod rolls while avoiding the problems of sod buckling or tearing encountered while using presently available equipment.

18 Claims, 15 Drawing Sheets

SOD LAYING APPARATUS

BACKGROUND OF THE INVENTION

In the past, the process of laying sod has been a very labor-intensive and time-consuming process. Sod is generally grown in large quantities in commercially-owned fields or nurseries. The sod is then cut into short, rectangular strips or longer strips which are formed into small rolls for storage and transport. After being transported to the desired location, the sod or small sod roll must be manually placed in a specific position, even with any previously laid sod, to cover the ground and form a lawn.

More recently, sod has been cut in rectangular strips of greater length and formed into very large rolls. In this form, the rolls of sod can be unrolled to cover a greater area more quickly and easily than the smaller, manually placed rectangular pieces or small sod rolls. Additionally, by using longer, wider rolls of sod, the number of seams between pieces of sod is reduced, producing an even, more desirable appearance.

These larger sod rolls often weigh in excess of one thousand pounds, and thus require the use of a sod laying machine or other equipment. A significant problem with such machines stems from the propensity of the rolls of sod to tear or break as it is being laid by the machine. These breakages can be caused by operation of the machine or variations in the condition of the sod itself within the roll. If the sod breaks while the machine is in operation, the operator must stop and readjust the machine to compensate for the gap left in the sod. Additionally, due to variations in terrain or speed of the machine, the sod can buckle, causing an unsightly appearance. Unless the user can adjust the speed of the unwinding sod roll (slower to cause the roll to pull up slack or faster to allow for more distribution over hills or rough terrain), the user will be required to stop the machine and adjust the sod at a significant loss of time.

U.S. Pat. No. 5,129,462 (granted to Mail) and U.S. Pat. No. 5,307,880 (granted to Woerner) both employ the use of a sod carrying apparatus mounted above a pair of driving tracks. When the driving tracks are propelled forward by the user, the roll of sod is rotated and caused to unroll onto the ground in front of the machine. U.S. Pat. No. 5,307,880 (Granted to Woerner) is distinguished in that it can dispense the sod in either a forward or reverse direction. The inherent problem with both of these machines is the fact that the speed of the dispensing roller depends solely upon the speed of the driving tracks, with no apparent method for either increasing or decreasing the speed at which the sod is placed on the ground. If the sod buckles or tears, the operator is still required to cease operation of the machine to adjust for the abnormality in the lain sod.

U.S. Pat. No. 5,215,278 (granted to Hess) shows an apparatus comprised of a conveyor mounted on a frame, which in turn is supported by ground engaging wheels. When the apparatus is pulled, the wheels are rotated and move the apparatus forward, while at the same time, the conveyor feeds sod from the roll onto the ground. While this apparatus successfully lays the sod on the ground, it requires the user to employ another vehicle to propel the apparatus. Because the user is engaged in the operation of the pulling vehicle, he is distanced from the sod being laid on the ground and unable to easily monitor its progress for breaks or buckles. Additionally, even if the operator does notice problems with the sod, as with the previously discussed machines, there is no means to adjust the speed of the conveyor, as it dependent on the speed of the ground engaging wheels.

U.S. Pat. No. 4,878,542 (granted to Brouwer et al.) describes a four-wheeled vehicle having a hydraulically controlled arm extending to the front of the apparatus to hold a roll of sod. The sod is released downward, towards the back of the apparatus and passes underneath the vehicle as it is dispensed. The operator's seat is located in the front of the vehicle, giving the driver a view of the sod as it is dispensed onto the ground. While the driver is able to see any abnormalities or breaks in the sod as it unrolls, it cannot prevent any buckles from occurring once the sod is placed on the ground. Because the sod passes underneath the wheels of the apparatus, the weight of the machine presses the sod into the ground, making buckles in the sod extremely difficult to remove.

From the foregoing discussion, it can be clearly seen that it would be desirable to provide a means for laying large rolls of sod by unrolling such rolls in an even and consistent manner. It is also desirable to provide a means by which the operator may adjust the speed by which the rolls of sod are unrolled, so as to more easily compensate for breaks or buckles in the sod without completely ceasing operation of the machine. It is also desirable to provide a means of installing sod which is easily maneuverable for difficult terrain or in limited spaces and further, can be utilized by a single operator.

SUMMARY OF THE INVENTION

It is a primary objective of the present invention to provide a means to lay sod, from large rolls, which unrolls the sod onto the ground in an even and consistent manner.

It is a further objective to provide a means by which the speed of the unrolling sod can be adjusted to correct breaks and buckles in the sod without cessation of operation.

It is a further objective of the present invention to provide a means by which large rolls of sod may be dispensed by a single operator.

It is still a further objective of the present invention to provide a means for laying large rolls of sod that is usable and easily maneuverable in tight areas and over rough terrain.

These objectives are accomplished by providing a hydrostatically driven three wheeled vehicle that enables a single operator to dispense sod from a large sod roll in an even and efficient manner. The three wheeled design, in which all of the wheels are hydrostatically driven, allows the present invention to be highly maneuverable in tight areas and to operate effectively over rough terrain.

In operation, a large sod roll is placed on the conveyor belt in the bay located behind the single front drive wheel and in front of the two rear drive wheels. As the conveyor surface moves toward the rear of the present invention, the sod roll is unrolled and the sod is dispensed at the rear of the vehicle, behind the rear drive wheels. Thus, because the dispensed sod is not overrun by the wheels of the vehicle, and is not pressed into the earth by the weight of the machine, as was the case in some of the prior art, it is easier to make adjustments in the dispensed sod.

The present invention employs a hydrostatic drive system which operates the drive wheels and the sod conveyor belt independently. This configuration allows the drive wheels and conveyor belt to be driven at the same or different speeds allowing the conveyor to be independently sped up or slowed down (in relation to the speed of the drive wheels) depending on the conditions encountered by the operator. This allows the operator to vary the rate at which the sod is dispensed to adjust for variances in the terrain being covered or in the consistency of the sod roll, thereby avoiding the problems of the sod buckling or tearing prevalent in the prior art, and making it possible for a single operator to lay sod effectively.

For a better understanding of the present invention, reference should be made to the drawings in which there is illustrated and described preferred embodiments of the present invention.

DESCRIPTION OF THE PREFERRED EMBODIMENT

Figure 1:
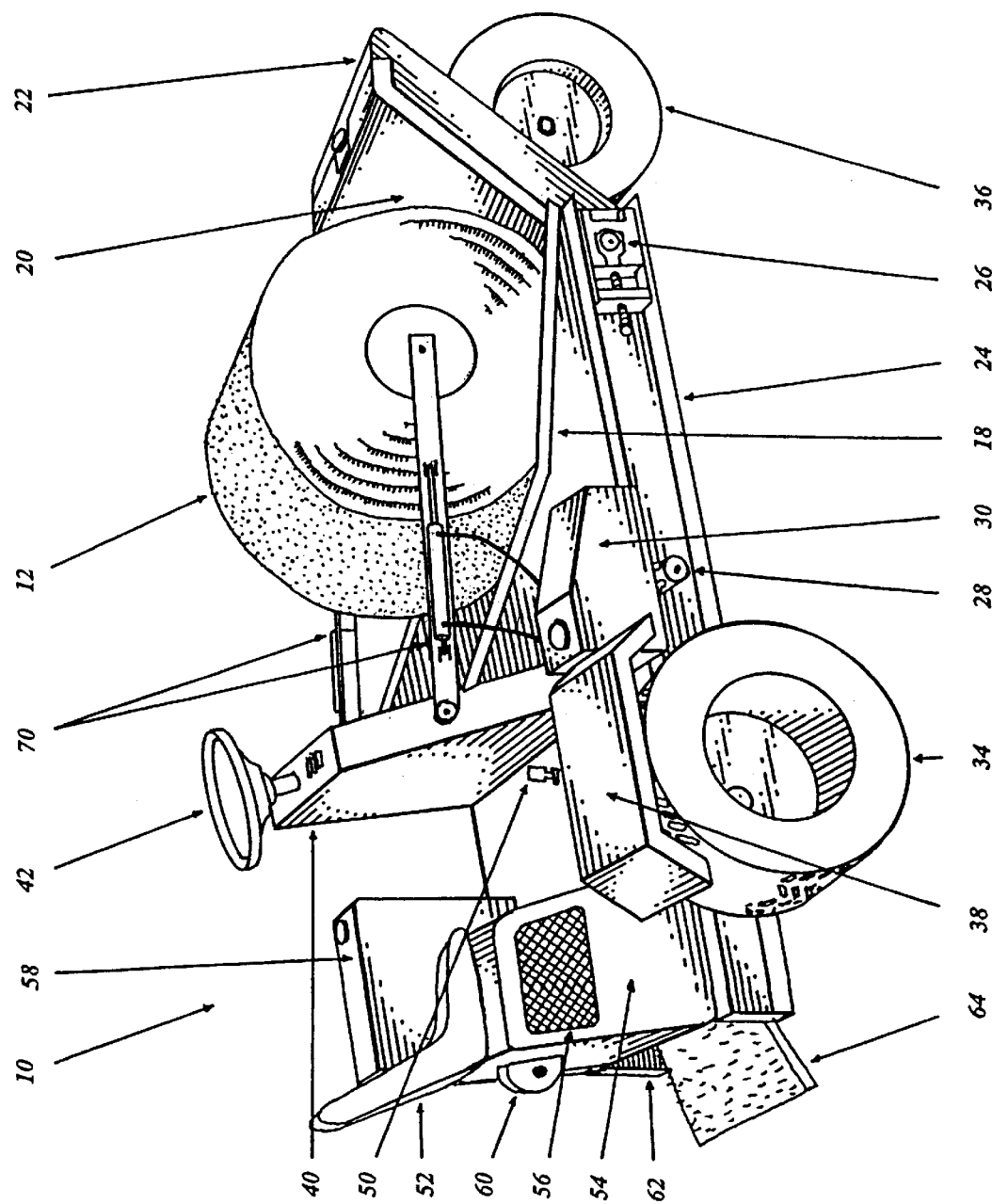
FIG. 1 is a perspective view of the sod laying apparatus showing the orientation of its major components in relation to one another, and the manner in which they work together to lay rolled sod.
Figure 2:
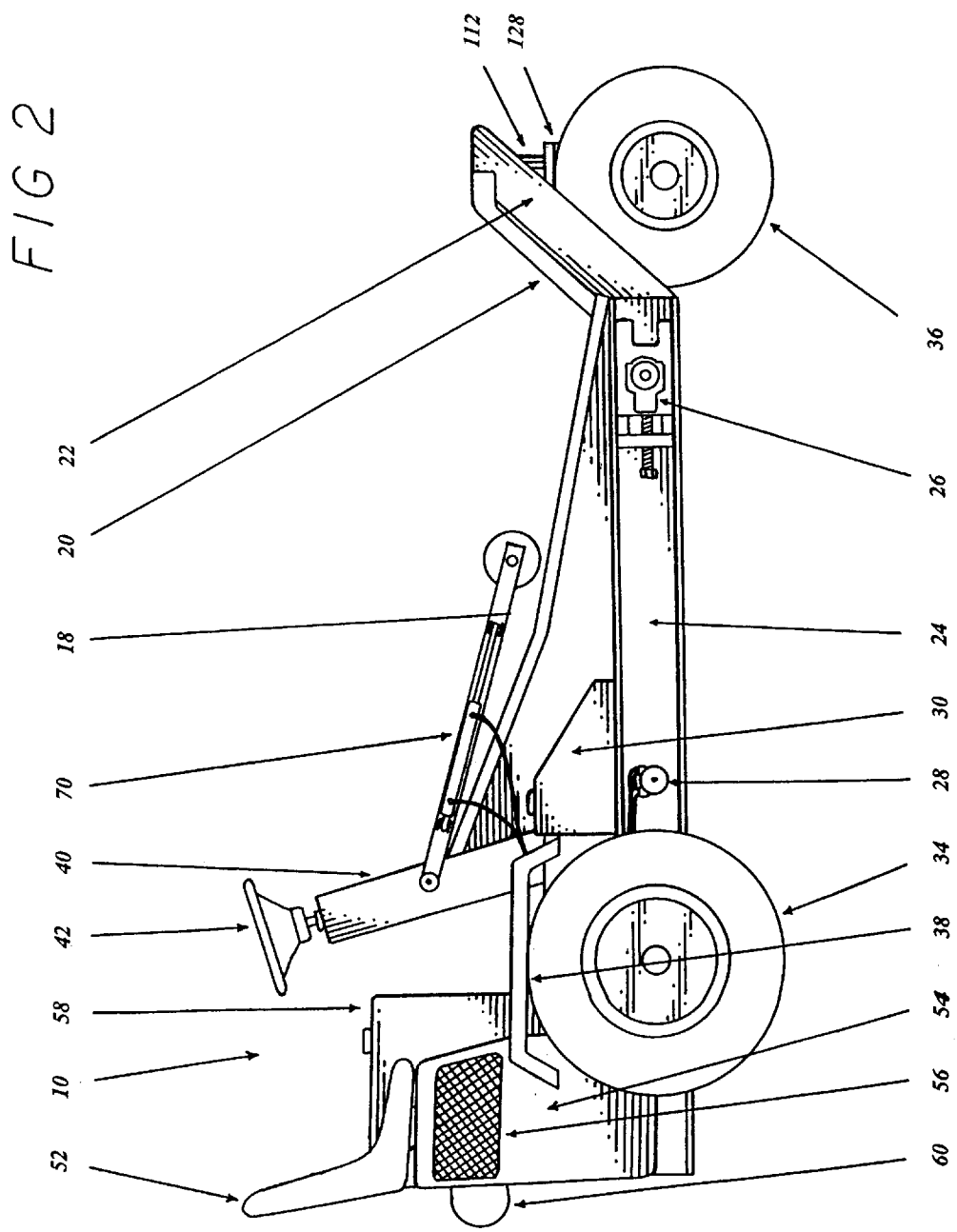
FIG. 2 is a side elevation view of the present invention showing the overall configuration and the general location of the drive wheels, operator seat, engine, conveyor motor and other components of said invention.
Figure 3:
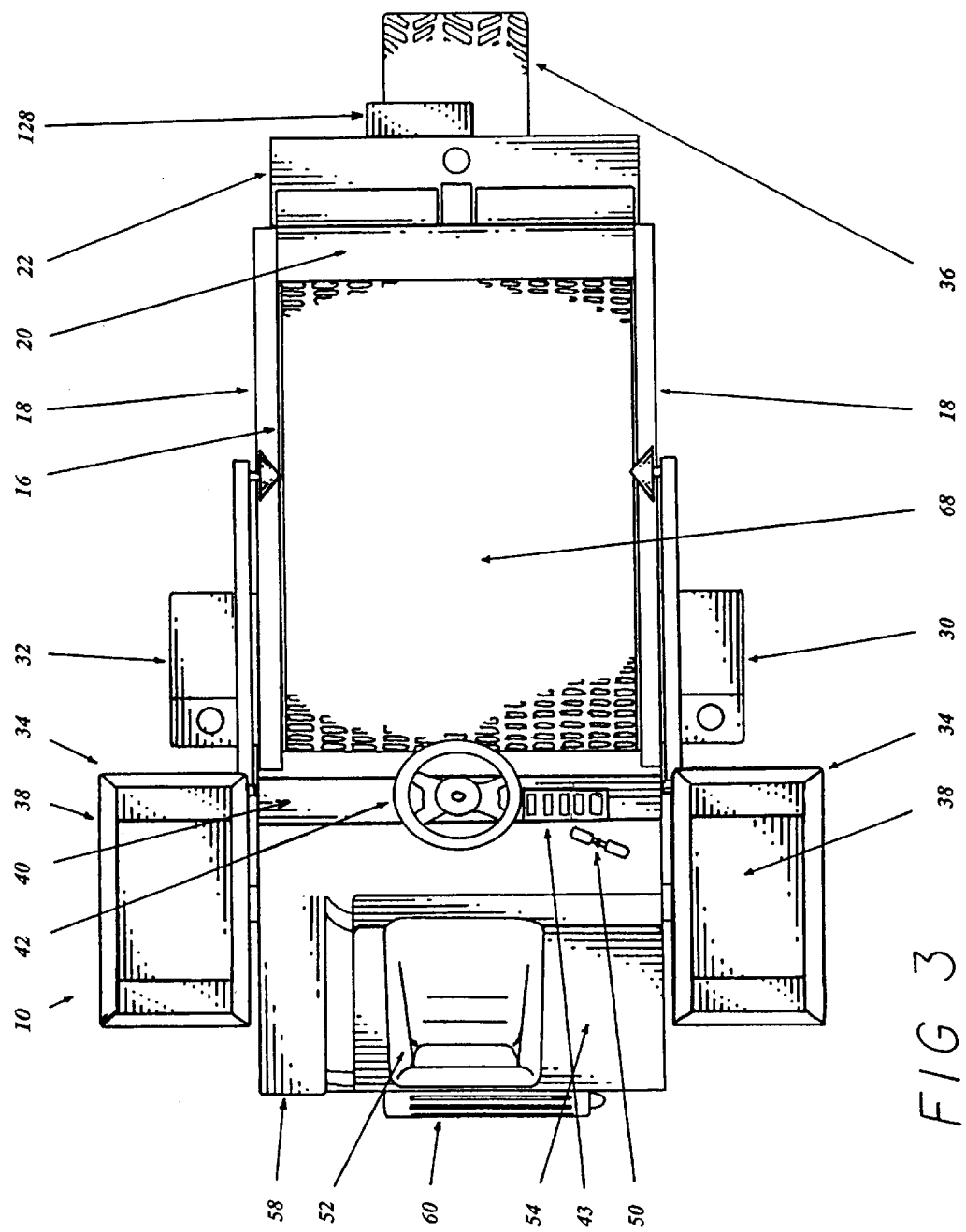
FIG. 3 is a top elevation view of the present invention showing the location of the conveyor belt in relation to the other components of said invention.
Figure 4:
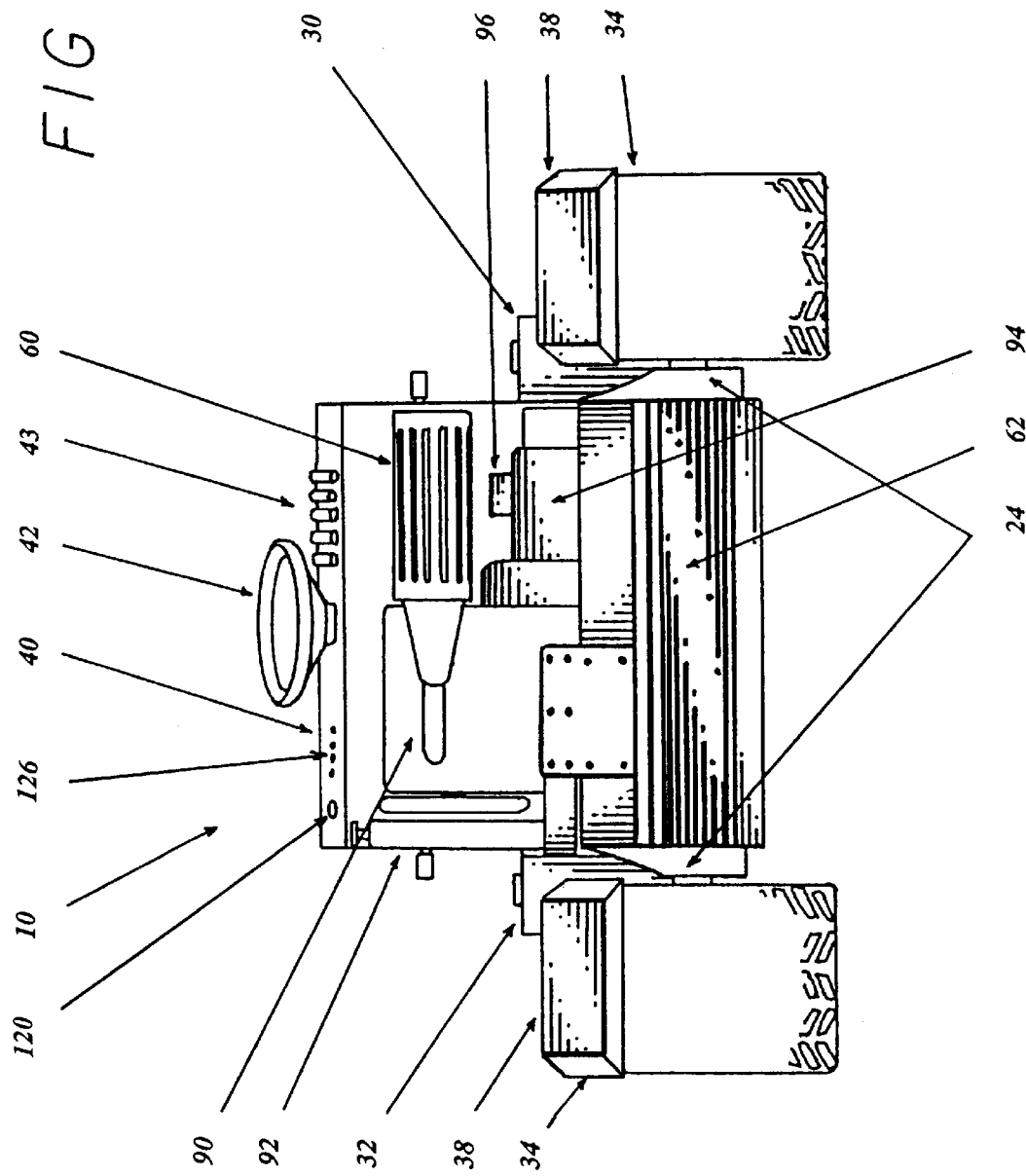
FIG. 4 is a rear elevation view of the present invention showing the orientation of the sod discharge chute in relation to the body of said invention.
Figure 5:
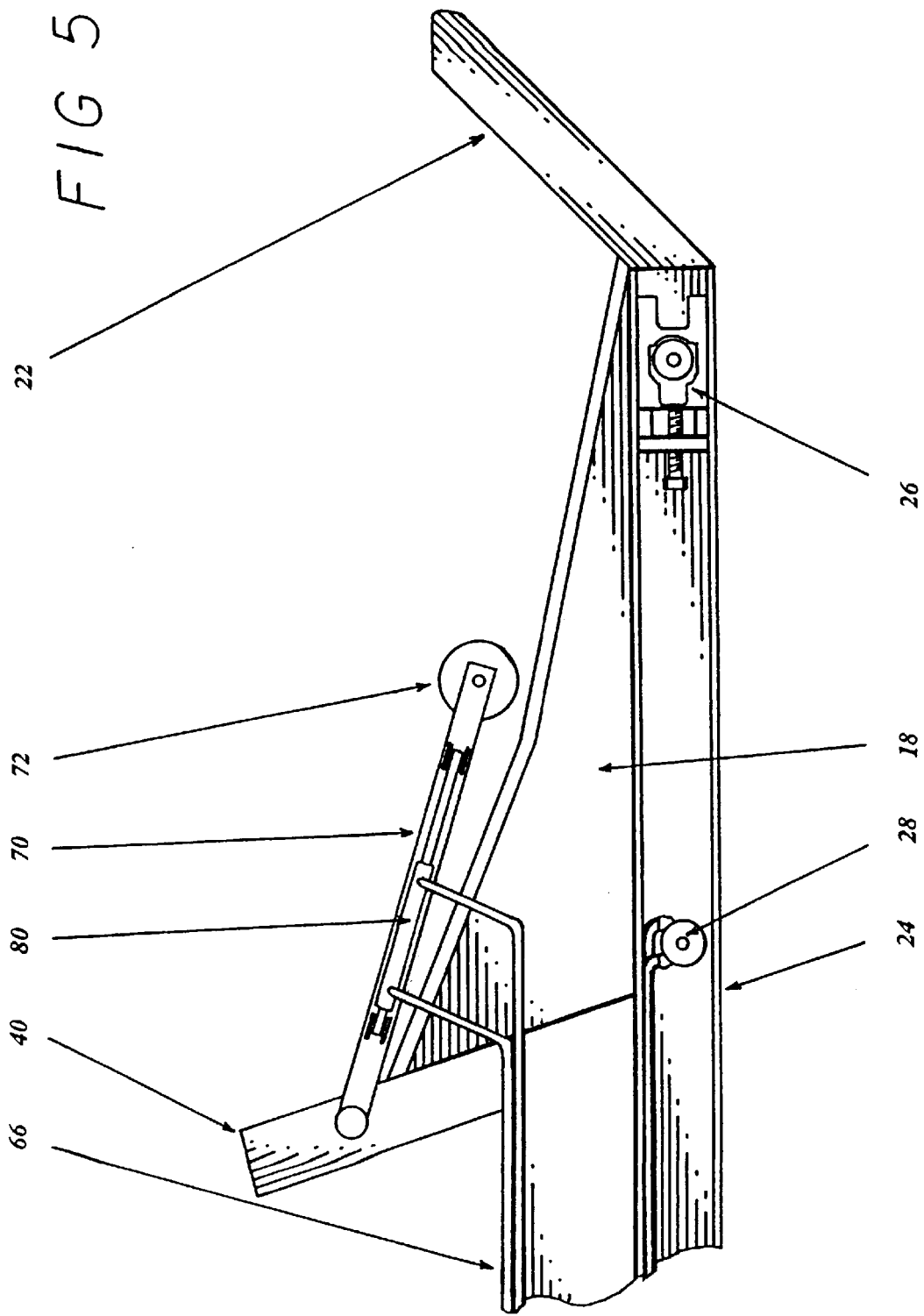
FIG. 5 is a side elevation view of the major frame components of the present invention showing the orientation of the sod roll holder arms, the conveyor motor and the conveyor tensioning device on the frame.
Figure 6:
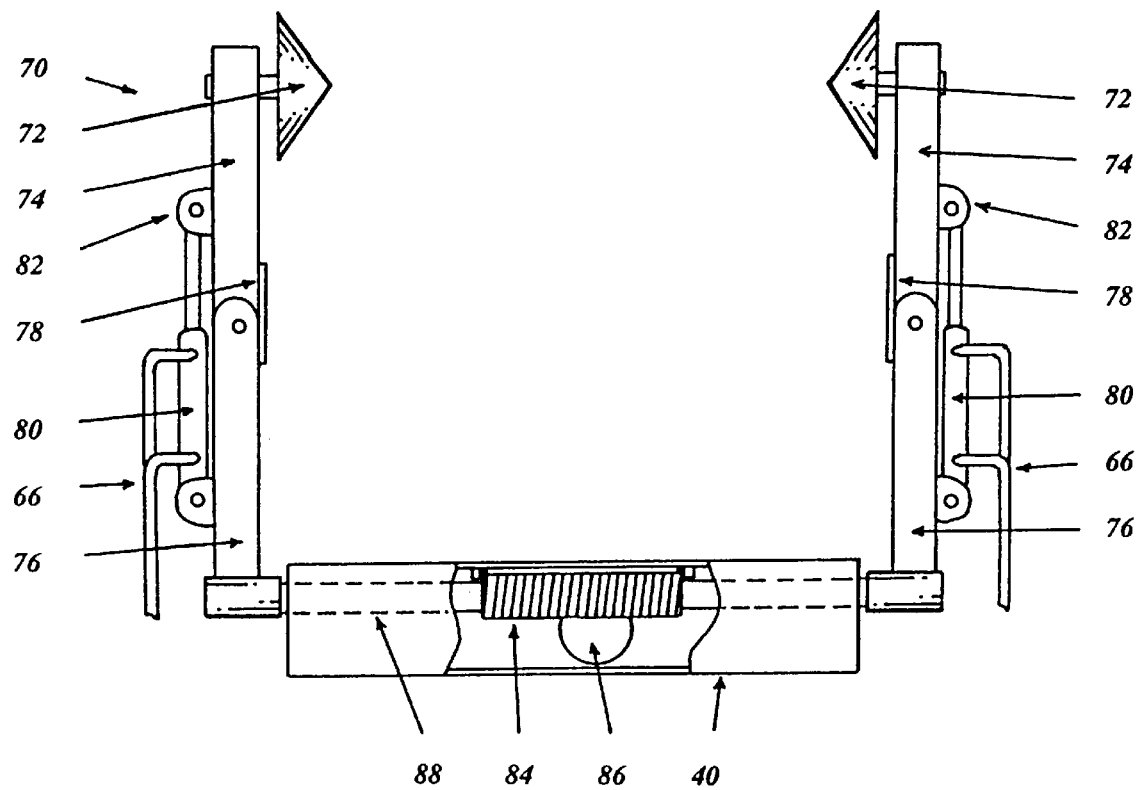
FIG. 6 is a top elevation view of the sod roll holder arms detailing their major components and the manner of construction of said arms.
Figure 7:
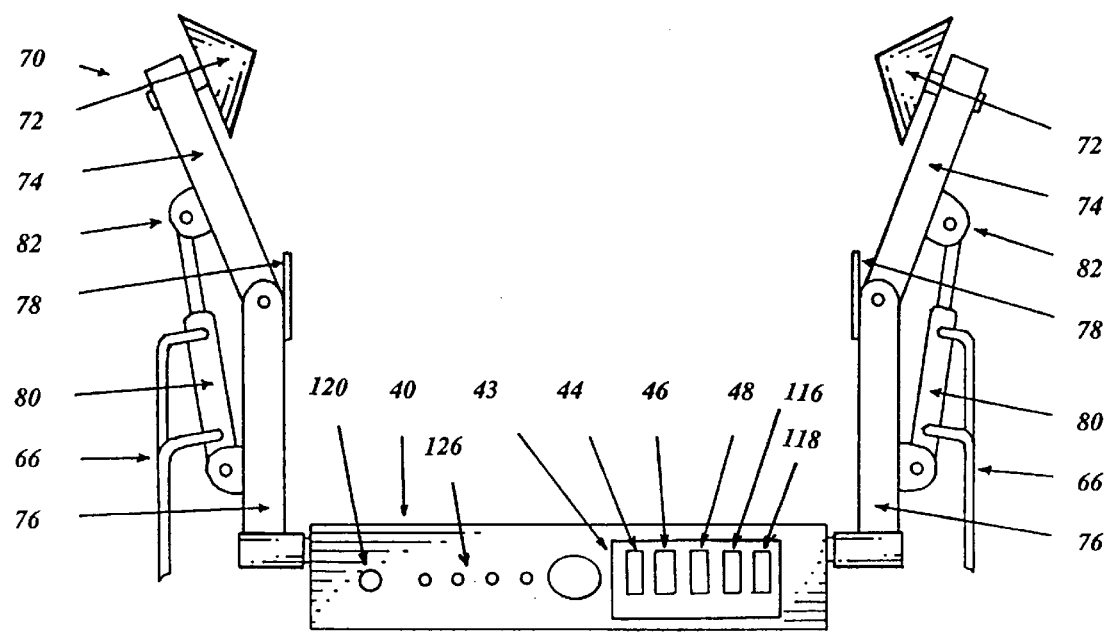
FIG. 7 is a top elevation view of the sod roll holder arms showing the manner in which the upper arms open to accept the insertion of a sod roll.
Figure 8:
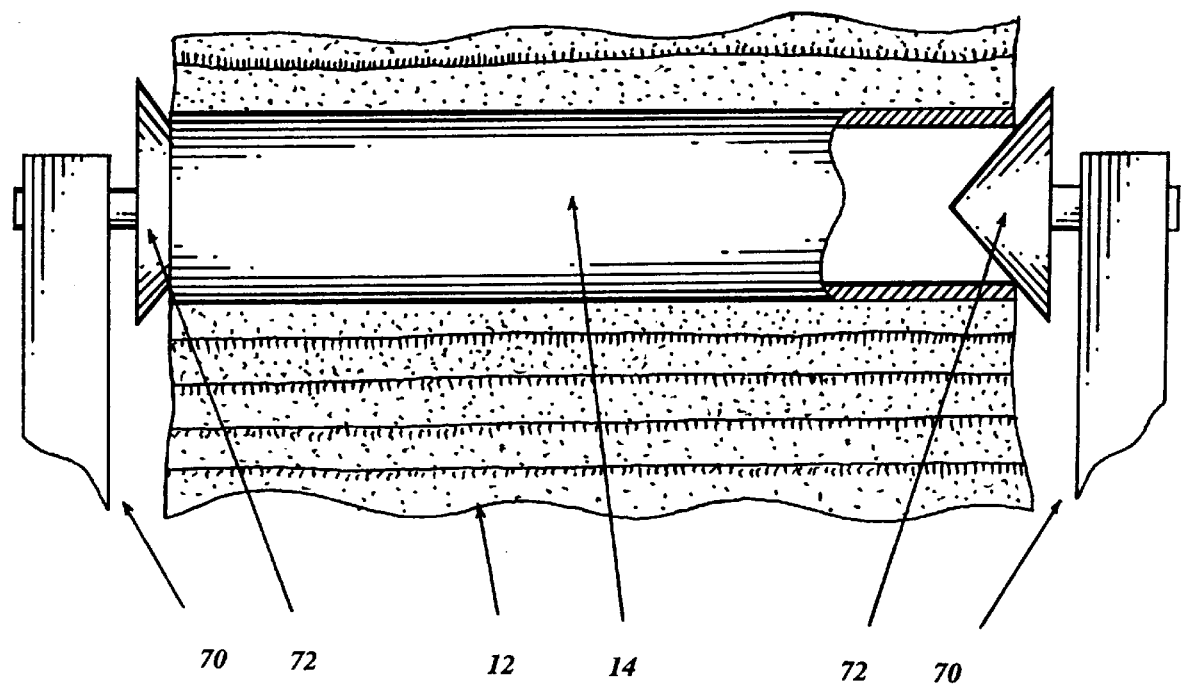
FIG. 8 is a top elevation, cut-away view of the sod roll holder arms detailing the manner in which the sod roll is engaged by the cones of said arms.
Figure 9:
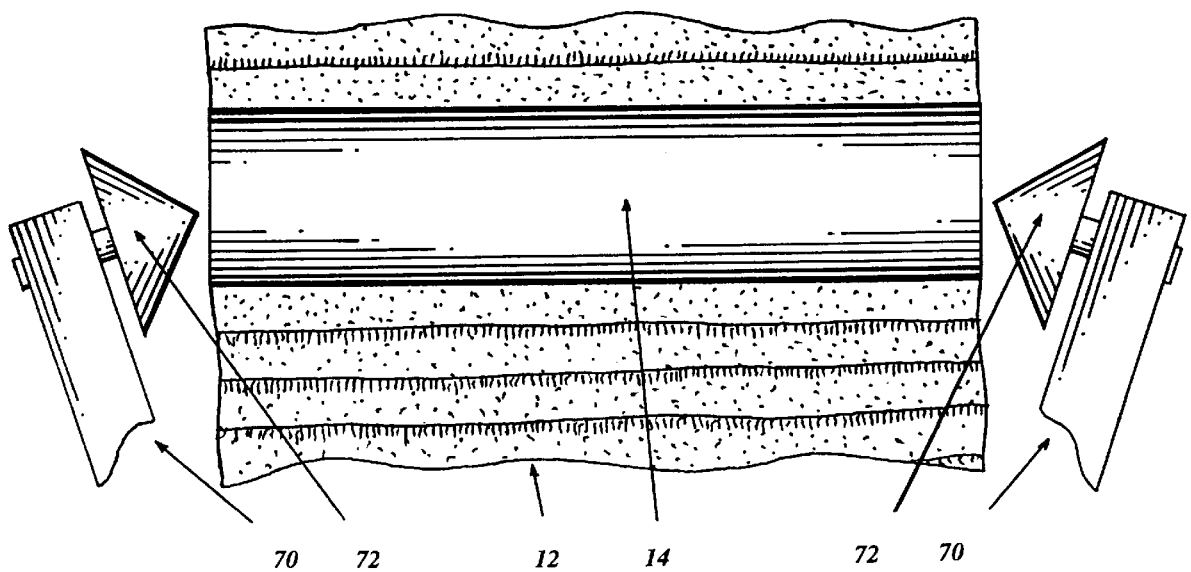
FIG. 9 is a top elevation, cut-away view of the sod roll holder arms detailing the manner in which the arms open to accept the insertion of a sod roll.
Figure 10:
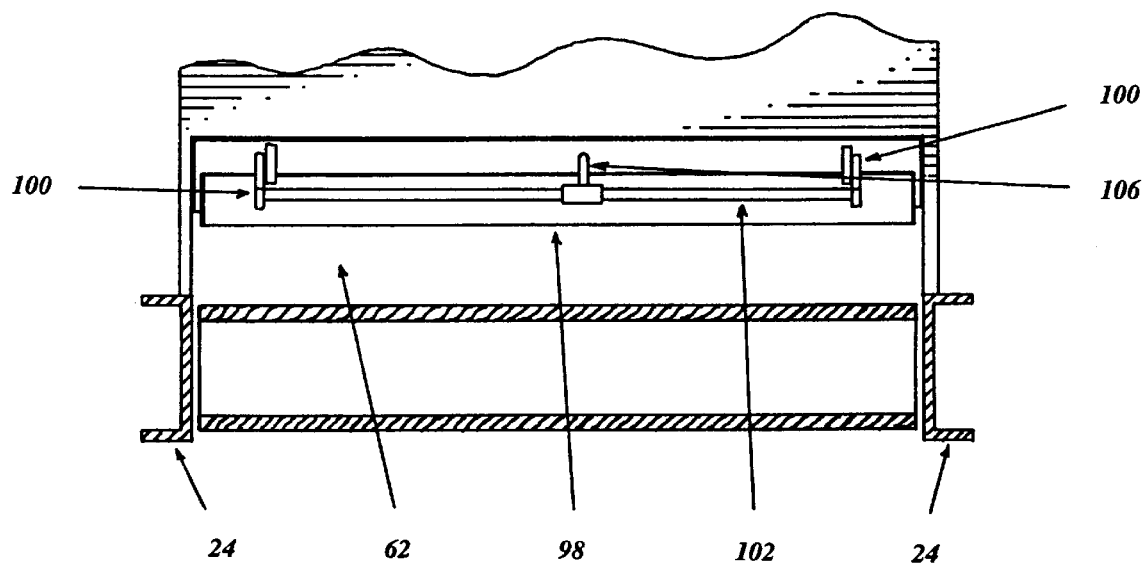
FIG. 10 is a front elevation view of the entrance to the sod dispensing chute detailing the location of the sod cutting knife within said chute.
Figure 11:
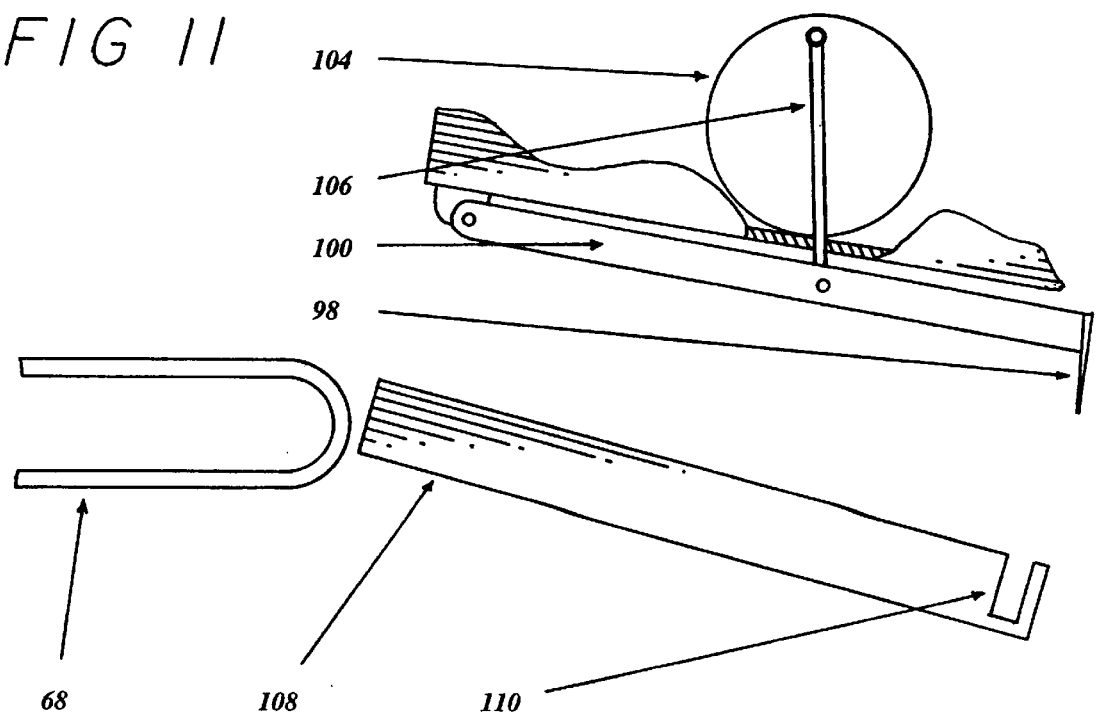
FIG. 11 is a side elevation cut-away view of the sod dispensing chute showing the orientation of the cutting knife within said chute and the location of the rotary actuator above the chute.
Figure 12:
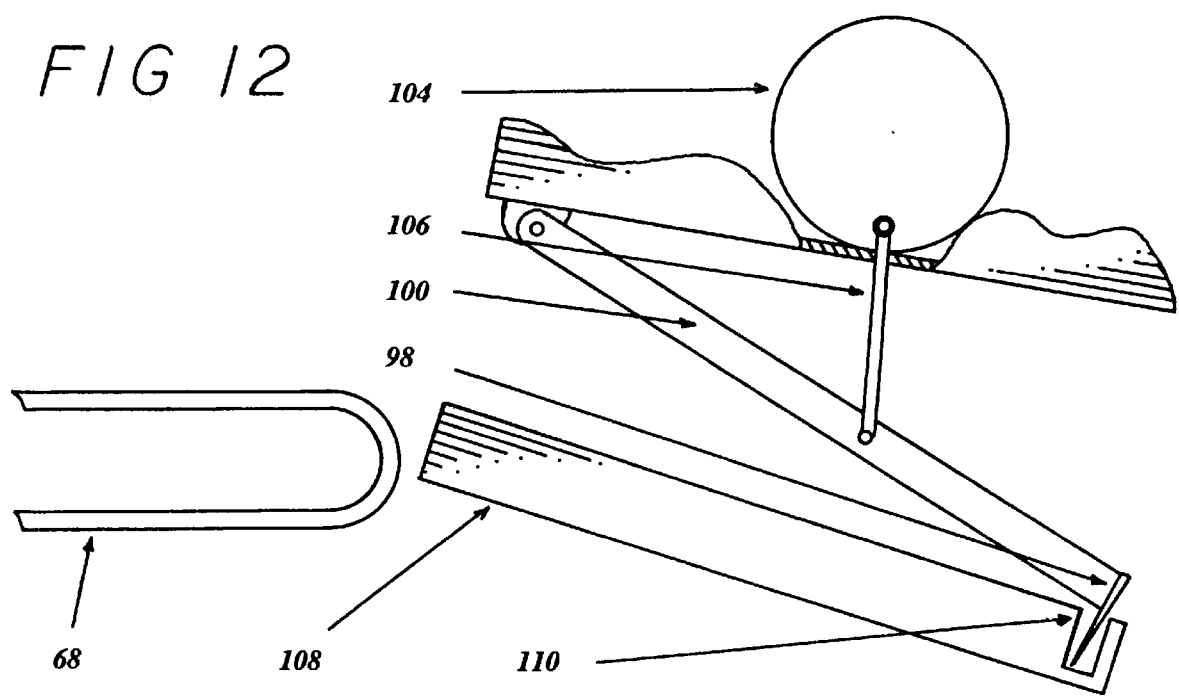
FIG. 12 is a side elevation cut-away view of the sod dispensing chute showing the manner in which the rotary actuator operates the sod cutting knife.
Figure 13:
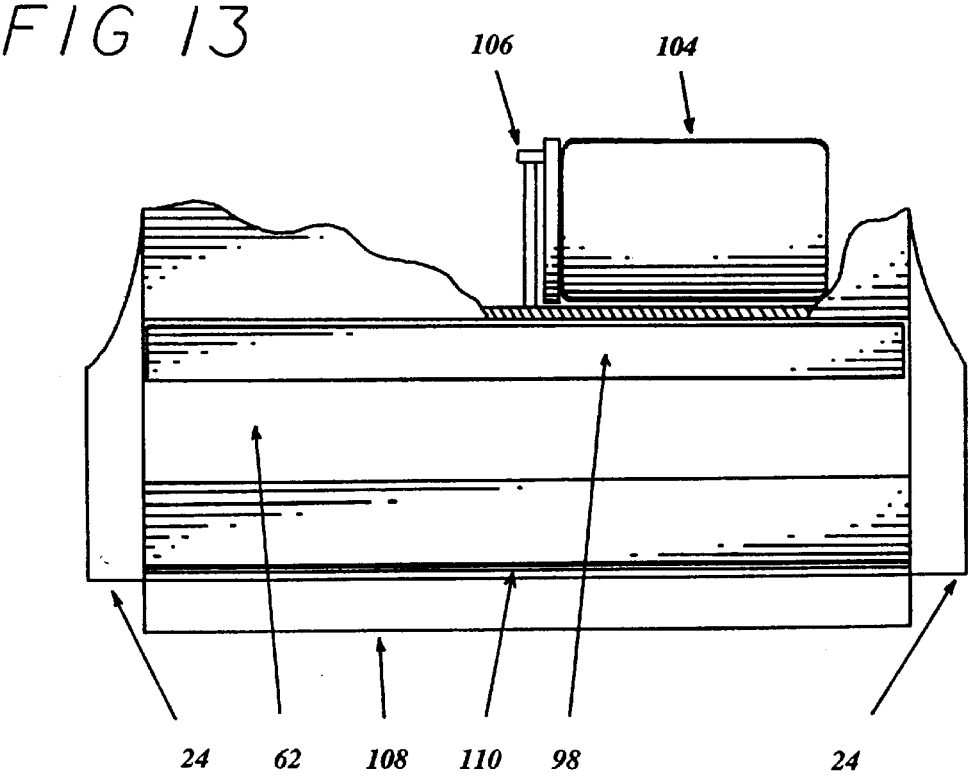
FIG. 13 is a rear elevation cut-away view of the sod dispensing chute showing the location of the sod cutting knife and the cutting knife slot at the rearward most end of the sod dispensing chute floor.

Referring now to the drawings, and more specifically to FIGS. 1, 2, 3, 4, 5 and 18 the hydrostatic sod laying apparatus 10 provides a means by which a roll of cut sod 12 grass side in may be easily and accurately unrolled automatically. The roll of sod 12 is placed in the sod roll bay 16 between the sod bay side walls 18, in front of the dash board 40, and behind the sod bay front wall liner 20. The sod roll 12 is held in place by the use of the sod roll holder arms 70, which are in turn attached at their most rearward end to the dash board 40.

When a sod roll 12 is placed in the sod bay 16 and on the conveyor 68, the front most portion of said sod roll 12 rests against the diagonal surface of the sod bay front wall liner 20. The diagonal surface 20, which is mounted to and supported by the front diagonal frame member 22, helps to facilitate the unrolling of the sod roll 12 as the conveyor 68 rotates and moves the dispensed sod strip 64 out of the dispensing chute 62 located at the most rearward portion of the present invention.

The hydrostatic sod laying apparatus 10 comprises a three-wheeled tricycle-type vehicle with all wheels being driven hydrostatically. The rear drive wheels 34 are mounted at the rearward and outside end of either side frame member 24 and just behind the hydraulic fluid reservoir 30 and the fuel tank 32. This arrangement provides a wide platform for lateral stability. Also located over the rear drive wheels 34 and connected to the side frame members 24 are the rear drive wheel fenders 38. This feature prevents mud and other debris collected by the rear drive wheels 34 from being thrown towards the operator during use.

The front drive/steering wheel 36 is mounted to and attached underneath the bottom side of the front diagonal frame member 22, located at the most forward end of the present invention. The front drive/steering wheel 36 is hydrostatically powered by the front hydrostatic propel motor 114 to provide additional propelling force to the present invention. The front drive/steering wheel 36 is also capable of being hydraulically rotated about its vertical axis through the use of the steering actuator 112 and the front wheel steering bar 128. The use of this system provides a means by which the present invention's directional attitude may be controlled by the operator.

The conveyor 68 of the present invention is hydrostatically driven by the conveyor drive motor 28 located on the side frame member 24, just forward of the hydraulic fluid reservoir 30 and opposite of the fuel tank 32. The conveyor drive motor 28 is capable of being operated independently from the present invention's other hydraulic systems. This enables the conveyor's 68 speed to be varied in relation to the forward speed of the hydrostatic sod laying apparatus 10. Also located on the side frame members 24 at their most forward point are the conveyor tensioning devices 26. These features are adjustable and enable the user to vary the tension on the conveyor 68, to make adjustment for wear, or to facilitate the removal and replacement of the conveyor 68.

The present invention is controlled by the user placing himself in the operator's seat 52 which is centrally located behind the dash board 40 and on top of the engine box 54. Directly in front of the operator's seat 52 and extending upward from the dash board 40 is the steering wheel 42. This component is linked with the front drive/steering wheel 36 and is used to control the directional attitude of the present invention during operation. Also, located on the dash board 40, directly in front of the operator, is the switch block 43, used to control the hydraulic functions of said invention, the ignition switch 120, and the function indicator lights 126. The foot drive control pedal 50, the means by which the operator controls the delivery of power from the hydrostatic pump 94, is located on the floor directly in front of the operator's feet.

The engine box 54, located directly below the operator's seat 52, is mounted horizontally and extends across most of the rearward edge of the present invention. The engine box 54 contains the horizontally mounted three-cylinder diesel engine 90 or other suitable engine which is used to drive the hydrostatic pump 94, attached to the engine 90. It is the hydrostatic pump 94 that provides the hydraulic power to the components of the hydrostatic sod laying apparatus 10. Additionally, attached to the hydrostatic pump 94 is the auxiliary pump 96 which provides hydraulic pressure for the steering function of the present invention. The engine's 90 muffler 60 extends out the back of the engine box 54, while the air necessary to run the engine 90 enters through the engine box air vent 56, located on the right side of the engine box 54. Directly to the left of the engine box 54 is located the radiator box 58, which contains the radiator 92, used to cool the engine 90.

FIGS. 5, 6, 7, 8 and 9 illustrate the construction of the sod roll holder arms 70 and the manner in which a sod roll 12 is retained within the present invention by said sod roll holder arms 70. Each of the two sod roll holder arms 70 comprises a lower holder arm 76 and an upper holder arm 74, which are pivotally attached to one another at the center point of said arm. This pivotally attachment point allows the sod roll holder arm 70 to open and close as needed to insert and remove sod rolls 12. The sod roll holder arms 70 are equipped with a stop plate 78 which is permanently attached to the inside upper most portion of the lower holder arm 76 and prevents said arms from extending beyond 180 degrees on their inside axis. The opening and closing function of the sod roll holder arms 70 is facilitated by the use of hydraulic cylinders 80 which are attached by the means of the hydraulic cylinder mounting brackets 82 at one end to the upper holder arm 74 and at the other end to the lower holder arm 76. Thus, when pressure is applied through the hydraulic lines 66 to the cylinders 80, causing them to contract or expand, the sod roll holder arms 70 open and close.

The sod roll holder arms 70 are attached at their most rearward portions to the sod roll holder center rod 88, which passes through and is attached to the body of the dash board 40. The sod roll holder center rod 88 has attached to it within the body of the dash board 40 a tensioning spring 84 which applies lifting force to the sod roll holder arms 70 which helps to stabilize the arms 70. Also located within the dash board 40 in this same general area is the steering orbital 86 which converts the rotational force applied to the steering wheel 42 to the hydraulic force used to steer the present invention. Located on the external and uppermost surface of the dash board 40 is the switch box 43 which contains the individual function switches 44, 46, 48, 116 and 118. These function switches control the drive function, the conveyor function, the drive and conveyor function, the clamping function of the hydraulic cylinders 70, and the cutting function of the hydrostatic sod laying apparatus 10. The uppermost surface of the dash board 40 also contains the ignition switch 120 and a plurality of function indicator lights 126.

Attached to the most forward ends of the sod roll holder arms 70 are the sod roll holder cones 72 which extend inward from said sod roll holder arms 70. When the sod roll holder arms are in the open position and a sod roll 12 is placed into the present invention, it is the sod roll holder cones 72 that engage and hold the sod roll 12 in place. This is accomplished by the use of a hollow sod roll tube 14 which is located at the center of the sod roll 12. The circumference of the sod roll holder cones 72 at their widest point is larger than the inside diameter of the ends of the sod roll tube 14 or tubeless sod roll (not shown). Therefore, the points of the sod roll holder cones 72 will fit inside the ends of the sod roll tube 14 or a tubeless sod roll (not shown) and hold the sod roll 12 in a secure and centered position between the two parallel sod roll holder arms 70.

FIGS. 10, 11, 12 and 13 illustrate the optional sod cutting function of the hydrostatic sod laying apparatus 10. The conveyor 68 feeds sod into the sod dispensing chute 62 where it slides down the diagonal chute floor 108. The sod dispensing chute 62 is general large enough to allow the passage of an empty sod roll tube 14 upon laying a sod roll 12. During the laying of a sod roll 12 it may become necessary for the operator to cut the dispensed sod 64 by activating the sod cutting knife 98, a sharp, horizontally mounted blade located at the rear of the sod dispensing chute 62. The sod cutting knife 98 is attached at its most outward points to the most rearward end of the sod cutting knife support bars 100. The sod cutting knife support bars 100 are at their most forward ends pivotally mounted to the sod dispensing chute 62. In turn, the sod cutting knife support bars 100 are spanned near to their center section by the sod cutting knife actuating bar 102, which in turn is attached at a center point to the rotary actuator connecting rod 106. The rotary actuator connecting rod 106 extends upward and is attached to the rotary actuator 104. Thus, as rotational force is applied by the rotary actuator 104, it forces the rotary actuator connecting rod 106 downward, thereby forcing the sod cutting knife 98 downward by means of the sod cutting knife actuating bar 102 and the sod cutting knife support bars 100. The sod cutting knife 98 engages the sod cutting knife slot 110 located at the end of the chute floor 108, thereby cutting any sod between said cutting knife 98 and cutting slot 110.

Figure 14:
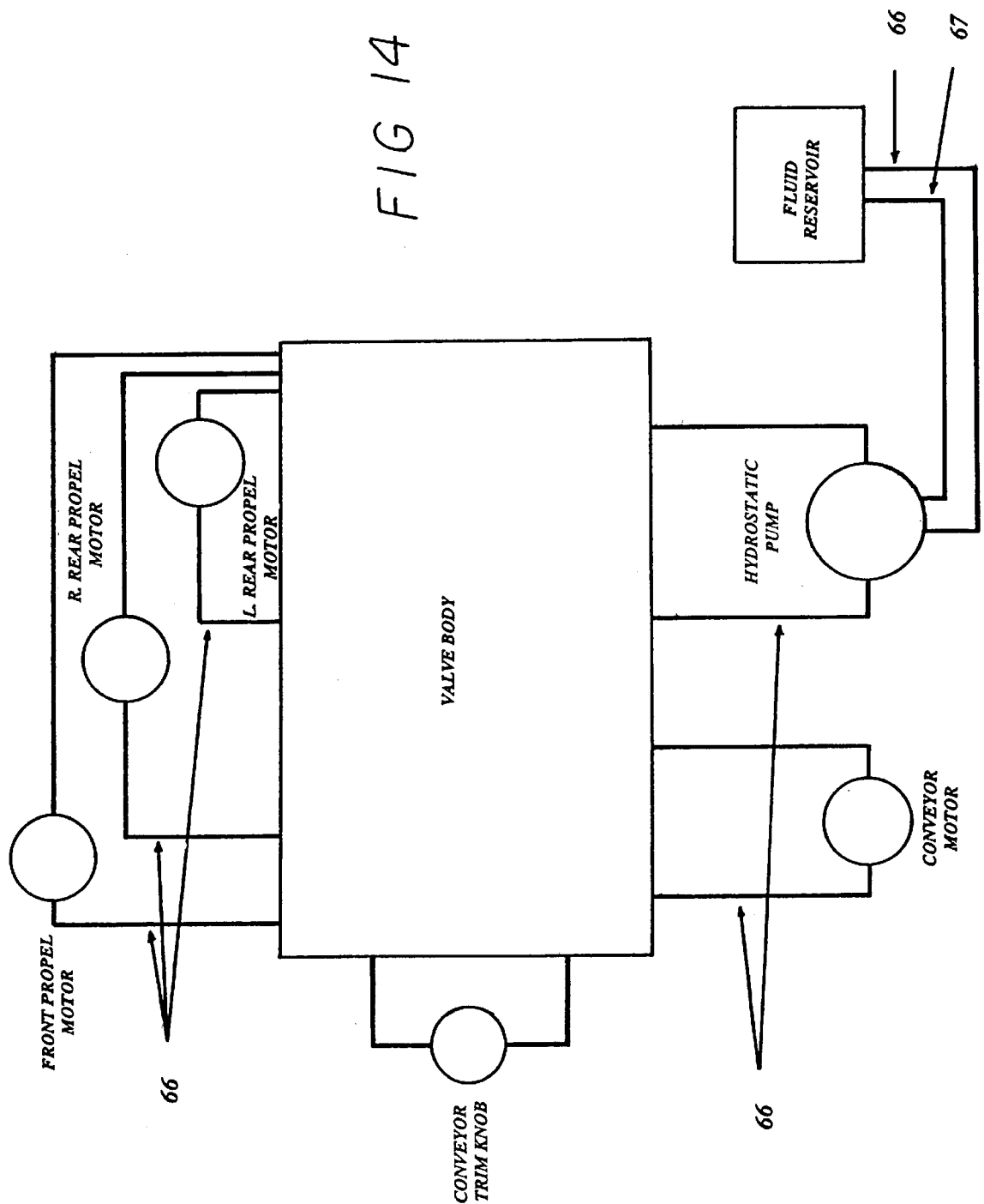
FIG. 14 is a schematic representation of the hydrostatic drive system of the present invention showing the manner in which hydraulic power is distributed to the present invention's drive components.

FIG. 14 is a schematic representation of the hydrostatic sod laying apparatus' 10 sequential drive and conveyor systems. Hydraulic fluid is supplied to the hydrostatic pump from the fluid reservoir by means of the hydraulic line 66 and returned to said reservoir by means of the return line 67. The hydrostatic pump supplies hydraulic pressure through the hydraulic lines 66 to the valve body. The valve body in turn supplies hydraulic pressure to the front propel motor, the right rear propel motor, the left rear propel motor and the conveyor motor. Additionally, hydraulic pressure is routed through the conveyor regulator switch which can be used to vary the speed of the conveyor motor.

Figure 15:
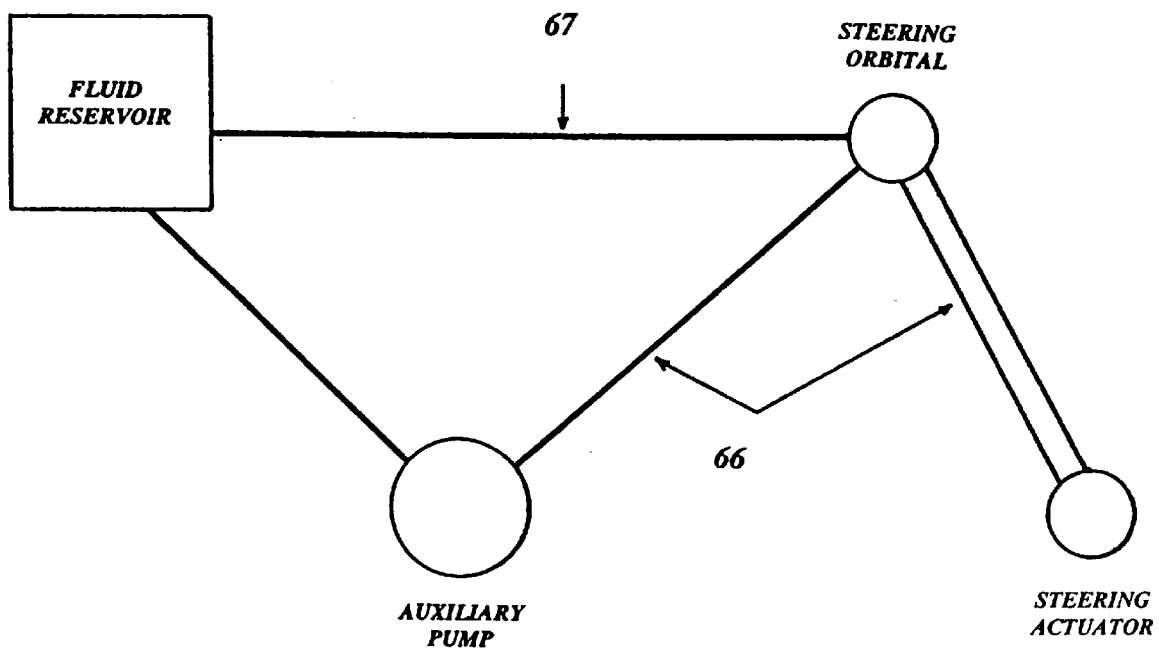
FIG. 15 is a schematic representation of the hydrostatic steering system of the present invention showing how the steering actuator is supplied with hydraulic pressure by the auxiliary pump.
Figure 16:
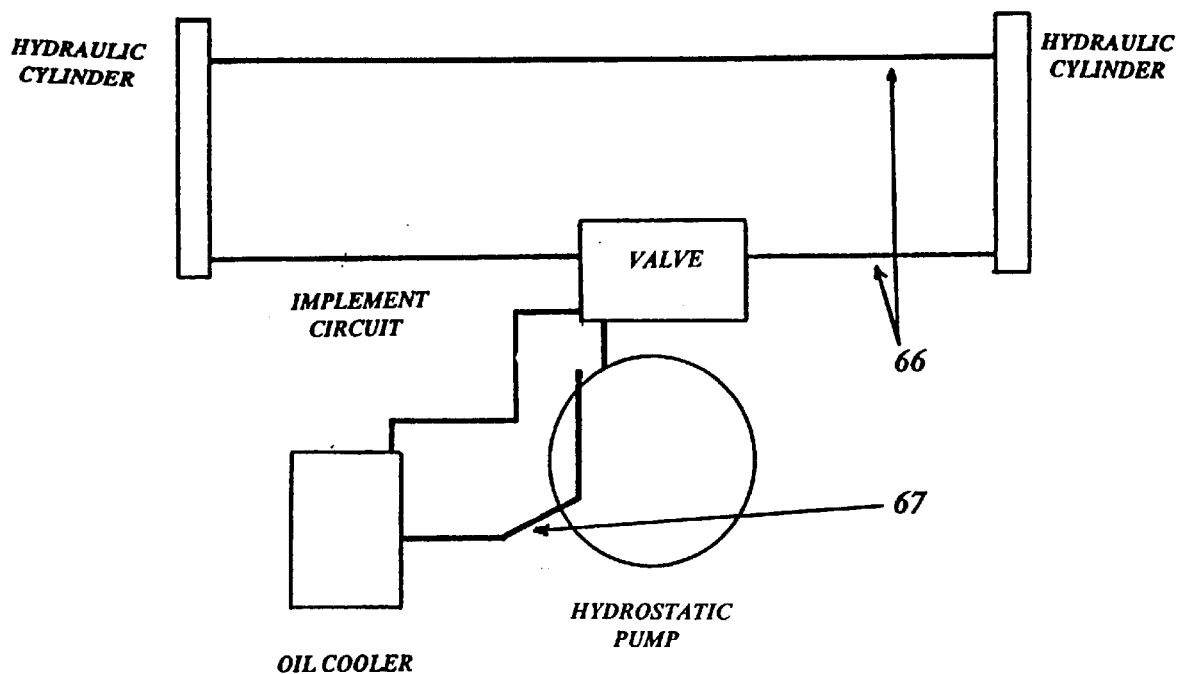
FIG. 16 is a schematic representation of the implement hydraulic system showing how the hydraulic cylinders on the sod roll holder arms are supplied with hydraulic pressure through the present inventions system.
Figure 18:
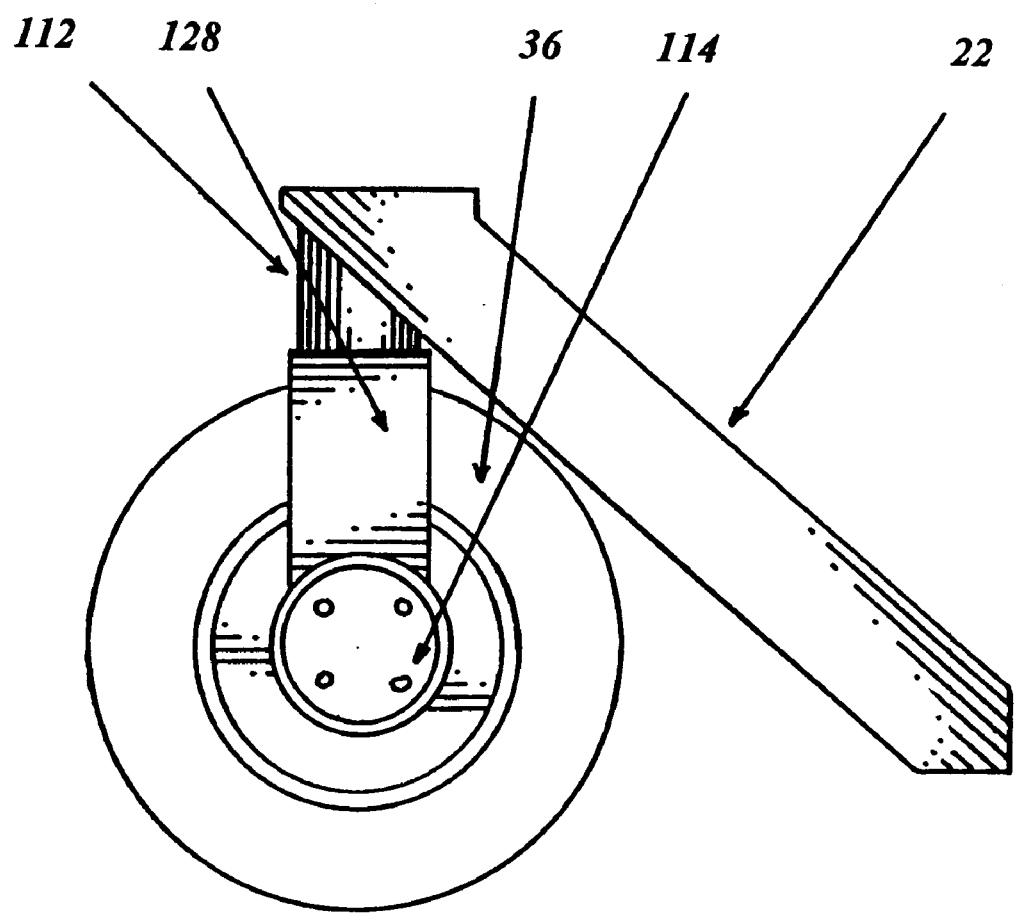
FIG. 18 is a side elevation cut-away view of the front steering wheel mounting position showing the overall configuration and the general location of the front propel motor and steering actuator on the present invention.

FIG. 15 is a schematic representation of the auxiliary hydraulic system used on the present invention. Hydraulic fluid is supplied to the auxiliary pump from the fluid reservoir by means of the hydraulic line 66. The auxiliary pump supplies hydraulic pressure to the steering orbital through the hydraulic line 66 which in turn sends pressure to the steering actuator through one of two hydraulic lines 66. Hydraulic fluid is returned to the fluid reservoir from the steering orbital by means of the return line 67. FIG. 16 is a schematic representation of the implement system used on the present invention. Hydraulic fluid is supplied to the implement system from the fluid reservoir by means of the hydraulic line 66. The implement system then supplies hydraulic pressure to the valve, which in turn sequentially supplies hydraulic pressure to the hydraulic cylinders through the hydraulic lines 66 after which it is returned to the valve. The hydraulic fluid is returned to the fluid reservoir from the valve by means of the return line 67.

Although the present invention has been described in considerable detail with reference to certain preferred versions thereof, other versions are possible. Therefore, the spirit and scope of the appended claims should not be limited to the description of the preferred versions contained herein.

What is claimed is:

1. A sod laying machine for unrolling a grass side in sod roll comprising:
    a substantially rectangular frame having a front and rear portion and a first and second side;
    an endless belt conveyor mounted toward said front portion of said frame said endless belt conveyor mounted so as to dispense sod from a roll;
    an endless belt conveyor drive system;
    a single wheel centered on the front portion of said frame;
    a first and second wheel mounted on the rear portion of said frame outside of said respective first and second side of said frame so as to allow sod to be dispensed between said first and second wheel; and
    a power source for propelling said sod laying machine.

2. The sod laying machine as in claim 1 further comprising a driver seating area positioned on the rear portion of said frame.

3. The sod laying machine as in claim 2 wherein said power source for propelling said sod laying machine is a hydrostatic drive means connected to said first and second wheel.

4. The sod laying machine as in claim 3 wherein said power source for propelling said sod laying machine further comprises a hydrostatic drive means connected to said wheel centered on the front portion of said frame and a steering means connected to said wheel centered on the front portion of said frame.

5. The sod laying machine as in claim 4 wherein said endless belt conveyer drive system is a hydrostatic conveyor drive means.

6. The sod laying machine as in claim 5 further comprising a first and second sod roll holder arm mounted so as to hold a sod roll on said endless belt conveyor.

7. A sod laying machine for unrolling a grass side in sod roll comprising:
    a substantially rectangular frame having a front and rear portion and a first and second side;
    an endless belt conveyor mounted towards said front portion of said frame for dispensing sod from a roll;
    an endless belt conveyor drive means;
    a single wheel centered on the front portion of said frame;
    a first and second wheel mounted on the rear portion of said frame outside of said respective first and second side of said frame;
    a means of propelling said sod laying machine; and
    a sod cutter portion for cutting portions of sod from said roll, said cutter positioned behind said endless belt conveyor and mounted so as cut pieces of sod as it is dispensed.

8. The sod laying machine as in claim 7 further comprising a driver seating area positioned on the rear portion of said frame.

9. The sod laying machine as in claim 8 wherein said means of propelling said sod laying machine is a hydrostatic drive means connected to said first and second wheel.

10. The sod laying machine as in claim 9 wherein said means of propelling said sod laying machine further comprises a hydrostatic drive means connected to said wheel centered on the front portion of said frame and a steering means connected to said wheel centered on the front portion of said frame.

11. The sod laying machine as in claim 10 wherein said endless belt conveyer drive means is a hydrostatic conveyor drive means.

12. The sod laying machine as in claim 11 further comprising a first and second sod roll holder arm mounted so as to hold a sod roll on said endless belt conveyor.

13. A sod laying machine for unrolling a grass side in sod roll comprising:
    a substantially rectangular frame having a front and rear portion and a first and second side;
    an endless belt conveyor mounted towards said front portion of said frame;
    a driver section in the rear portion of said frame;
    a power means attached to the rear portion of said frame;
    a hydrostatic drive means for said endless belt conveyor said hydrostatic drive means being powered by said power means;
    a means of controlling the speed of said hydrostatic drive means;
    a single wheel centered on the front portion of said frame;
    a first and second wheel mounted on the rear portion of said frame outside of said respective first and second side of said frame; and
    a means of propelling said sod laying machine powered by said power means.

14. The sod laying machine as in claim 13 further comprising a sod cutter portion for cutting portions of sod from said roll, said cutter positioned behind said endless belt conveyor and mounted so as to cut pieces of sod as it is dispensed.

15. The sod laying machine as in claim 14 wherein said power means is a fuel powered engine.

16. The sod laying machine as in claim 15 wherein said means of propelling said sod laying machine is a hydrostatic drive means connected to said first and second wheel.

17. The sod laying machine as in claim 16 wherein said means of propelling said sod laying machine further comprises a hydrostatic drive means connected to said wheel centered on the front portion of said frame and a steering means connected to said wheel centered on the front portion of said frame.

18. The sod laying machine as in claim 13 further comprising a first and second sod roll holder arm mounted so as to hold a sod roll positioned on said endless belt conveyor.

* * * * *